(12) United States Patent
Seeger

(10) Patent No.: US 10,650,589 B1
(45) Date of Patent: May 12, 2020

(54) GENERATING SURFACE APPROXIMATIONS USING CURVATURE INTEGRALS FOR SURFACE VISUALIZATION RENDERING

(71) Applicant: HERE Global B.V., Eindhoven (NL)

(72) Inventor: Mauritius Seeger, Berlin (DE)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 16/374,028

(22) Filed: Apr. 3, 2019

(51) Int. Cl.
*G06T 17/20* (2006.01)
*G06F 3/0484* (2013.01)
*G06F 16/904* (2019.01)

(52) U.S. Cl.
CPC .......... *G06T 17/20* (2013.01); *G06F 3/04847* (2013.01); *G06F 16/904* (2019.01); *G06F 2203/04806* (2013.01)

(58) Field of Classification Search
CPC ..... G06T 17/20; G06T 17/05; G06T 2210/36; G06T 7/12; G06T 15/50; G06T 17/00; G06F 16/904; G06F 3/04847; G06F 2203/04806; G01C 21/005; H04W 72/085; H04W 4/029
See application file for complete search history.

(56) References Cited

U.S. PATENT DOCUMENTS

| | | | | |
|---|---|---|---|---|
| 5,526,260 A * | 6/1996 | Kodet | ................. | G01C 21/005 701/3 |
| 6,738,062 B1 * | 5/2004 | Moreton | ................. | G06T 17/20 345/420 |
| 2011/0060478 A1 * | 3/2011 | Nickolaou | ............ | G01S 17/023 701/1 |

(Continued)

FOREIGN PATENT DOCUMENTS

CN 103177258 A 6/2013

OTHER PUBLICATIONS

Duan et al., *A High-Fidelity Multiresolution Digital Elevation Model for Earth Systems*, Geoscientific Model Development, vol. 10, Issue 1, (2017), pp. 239-253. [Retrieved from the Internet Jul. 22, 2019] <URL: https://www.geosci-model-dev.net/10/239/2017/>.

(Continued)

*Primary Examiner* — Xilin Guo
(74) *Attorney, Agent, or Firm* — Alston & Bird LLP

(57) ABSTRACT

An apparatus accesses terrain data describing a surface and comprising a plurality of positions located on the surface. The apparatus determines curvatures/second derivatives of the surface between adjacent positions along surface spanning lines along the surface. The apparatus defines vertices by determining an accumulated absolute curvature along the line spanning the surface based on the curvature between positions by adding the absolute value of the curvature to the accumulated absolute curvature, determining whether the accumulated absolute curvature is equal to or greater than a reset value, and when it is determined that the accumulated absolute curvature is equal to or greater than the reset value, defining a vertex at the position. When it is determined that the accumulated absolute curvature is not equal to or greater than the reset value, the absolute value of the next curvature is added to the accumulated absolute curvature.

20 Claims, 6 Drawing Sheets

(56) References Cited

U.S. PATENT DOCUMENTS

| | | | | |
|---|---|---|---|---|
| 2013/0013204 | A1* | 1/2013 | Kazama | G01C 21/20 |
| | | | | 701/533 |
| 2014/0032184 | A1* | 1/2014 | Carrasco | G06F 17/5095 |
| | | | | 703/1 |
| 2014/0267273 | A1* | 9/2014 | Kontkanen | G06T 15/04 |
| | | | | 345/426 |
| 2014/0278065 | A1* | 9/2014 | Ren | G06T 15/04 |
| | | | | 701/454 |
| 2016/0171758 | A1* | 6/2016 | Dominici | G06T 15/50 |
| | | | | 345/419 |

OTHER PUBLICATIONS

Gao, *Algorithms and Software Tools for Extracting Coastal Morphological Information From Airborne LiDar Data*, Thesis, College Station, Texas, Texas A&M University. May 2009, (135 pages).

Sivaswamy et al., (2006) *An Alternative Curvature Measure for Topographic Feature Detection*, Computer Vision, Graphics and Image Processing, Lecture Notes in Computer Science, vol. 4338. Springer, Berlin, Heidelberg, pp. 228-239. [Retrieved from the Internet Jul. 22, 2019] <URL: https://link.springer.com/chapter/10.1007%2F11949619_21>.

Kweon et al., *Extracting Topographic Terrain Features From Elevation Maps*, CVGIP: Image Understanding, vol. 59, Issue 2, Mar. 1994, pp. 171-182. [Retrieved from the Internet Jul. 22, 2019] <URL:https://www.sciencedirect.com/science/article/pii/S1049966084710114?via%3Dihub>.

Rana, *Use of Plan Curvature Variations for the Identification of Ridges and Channels on DEM*, Progress in Spatial Data Handling, (2006), Springer, Berlin, Heidelberg, (12 pages). [Retrieved from the Internet Jul. 22, 2019] <URL:https://link.springer.com/chapter/10.1007%2F3-540-35589-8_49>.

Fowler, Robert J. et al. *Automatic Extraction of Irregular Network Digital Terrain Models*, In Proceeding ACM SIGGRAPH '79 Proceedings of the 6th Annual Conference on Computer Graphics and Interactive Techniques, vol. 13, Issue 2, Aug. 1979, pp. 199-207.

Chen, Zi-Tan et al. *Systematic Selection of Very Important Points (VIP) From Digital Terrain Model for Constructing Triangular Irregular Networks*, Auto-Carto. vol. 8., (1987), pp. 50-56.

Lee, Jay. *Comparison of Existing Methods for Building Triangular Irregular Network, Models of Terrain From Grid Digital Elevation Models*, International Journal of Geographical Information System, vol. 5, Issue 3, (1991), pp. 267-285. DOI:10.1080/02693799108927855.

Scarlatos, Lori L. *Spatial Data Representations for Rapid Visualization and Analysis*. PhD Thesis, CS Dept, University of New York at Stony Brook, (1993), (176 pages).

Scarlatos, Lori L. et al. *Optimizing Triangulations by Curvature Equalization* . . . VIS '92 Proceedings of the 3rd Conference on Visualization '92, pp. 333-339. IEEE ComputER Societ Press, Oct. 1992, Boston, Masachusetts. ISBN: 0-8186-2896-0.

Garland, Michael et al. *Fast Polygonal Approximation of Terrains and Height Fields*, School of Computer Science, Carnegie Mellon University, Sep. 19, 1995, (40 pages).

\* cited by examiner

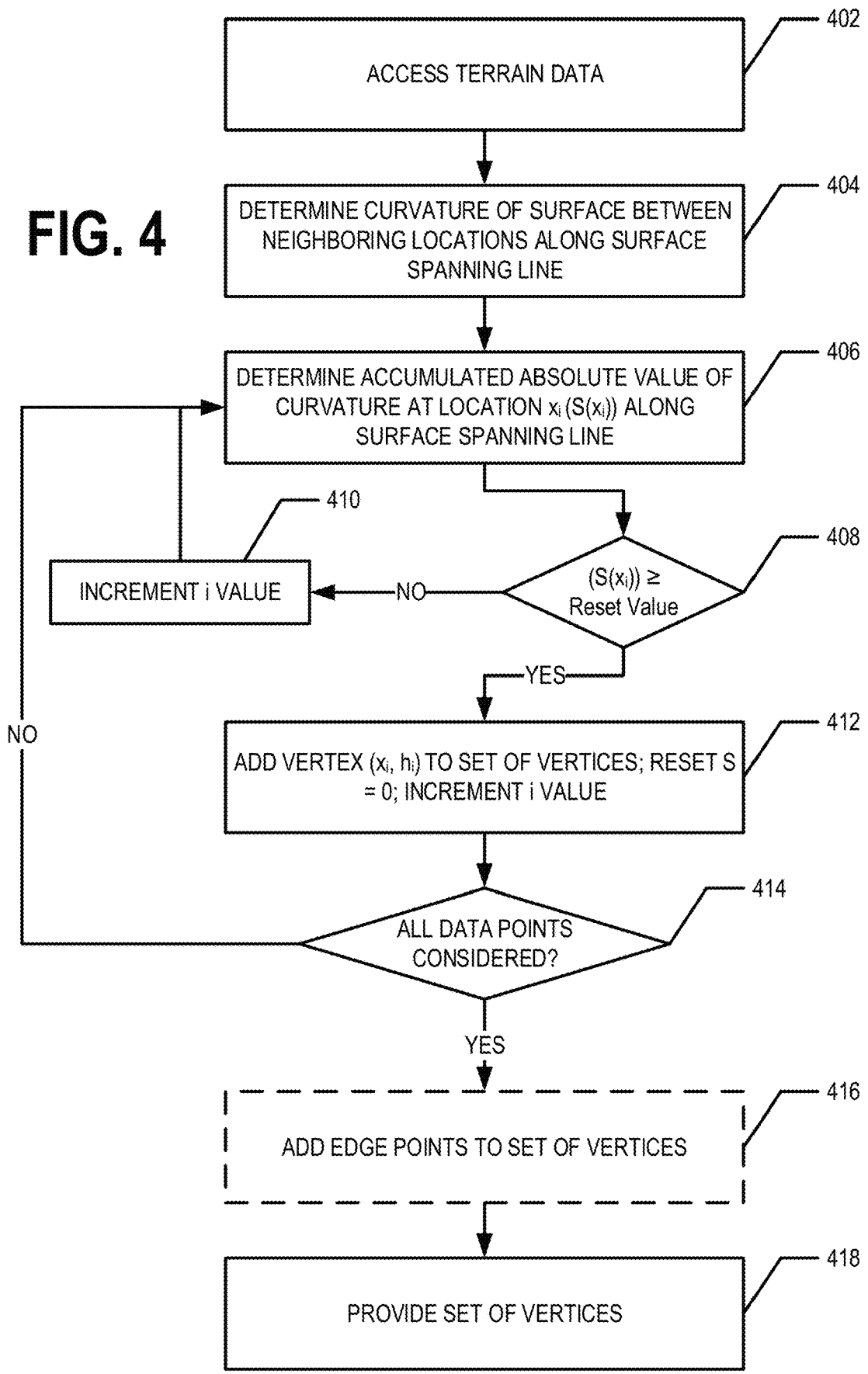

```
501    define reset_value
502    initialize empty vertex_array
503    access terrain_data
504    initialize N = number of positions in terrain_data 505    i = 0
506    for i < N {
507            xᵢ = location of ith position
508            hᵢ = height of ith position
509            i = i + 1
510    }

511    i = 1
512    for i < N {
513            determine cᵢ = curvature of surface along a line between locations x₍ᵢ₋₁₎ and xᵢ
514            i = i + 1
515    }

516    S = 0

517    for i = 1, i < N {
518            S = S + cᵢ
519            if S ≥ reset_value {
520                    add (xi, hi) to vertex_array
521                    S = 0
522            }
523            i = i + 1
524    }

525    add point (x₀, h₀) to vertex_array
526    add point (x₍N₋₁₎, h₍N₋₁₎) vertex_array 527    provide vertex_array
```

FIG. 5

GENERATING SURFACE APPROXIMATIONS USING CURVATURE INTEGRALS FOR SURFACE VISUALIZATION RENDERING

TECHNOLOGICAL FIELD

An example embodiment relates generally to generating a surface approximation for surface visualization rendering. An example embodiment relates generally to defining vertices of a surface mesh used to approximate a surface for use in surface visualization rendering.

BACKGROUND

Terrain data is typically measured and stored in raster format: uniform grids of height measurements, much like a digital image, but with height instead of brightness. When displaying terrain data, the terrain data is first converted to a triangular surface mesh. The surface mesh may be texture mapped to provide for a realistic rendering of the visualization of the terrain data. Generally, the triangular surface mesh is a set of 3D vertices connected to each other to form a mesh of seamless triangles. Surface meshes are used in computer graphics, mechanical engineering and other fields for both visualization and simulation. However, determining a triangular surface mesh from raster data may be computationally complex and/or require significant processing time.

BRIEF SUMMARY OF SOME EXAMPLE EMBODIMENTS

Various embodiments provide methods, systems, apparatuses, and computer program products for defining vertices for use in defining a surface mesh representing and/or approximating a surface. The surface mesh is used to render a visualization of the surface, perform one or more navigation functions, and/or the like, in various embodiments.

There are generally two broad categories of surface mesh models: a Triangulated Regular Network (TRN), and a Triangulated Irregular Network (TIN). A TIN takes advantage of the fact that natural terrains often consist of slowly-changing areas that can be approximated with fewer number of triangles per unit area. The resulting mesh uses significantly fewer triangles compared to a TRN, thus is more suitable for both data storage and visualization. Various embodiments generate a TIN from terrain data (e.g., raster data) that minimizes both and/or acts to balance the number of vertices and the error between the surface described by the mesh and the surface described by the original terrain data. Various embodiments generate the set of vertices in a fast and computationally efficient manner.

In various embodiments, an accumulated absolute curvature is determined by summing the absolute value of the curvature of the surface, as defined by the terrain data, along a surface spanning line until the accumulated absolute curvature reaches and/or surpasses a reset value. When the accumulated absolute curvature reaches and/or surpasses the reset value, a vertex of the surface mesh is defined and the accumulated absolute curvature is reset. The summing of the absolute value of the curvature of the surface to determine the accumulated absolute curvature is continued along the surface spanning line. Each time the accumulated absolute curvature is determined to reach and/or surpass the reset value, another vertex of the surface mesh is defined and the accumulated absolute curvature is reset. The process may be completed along a plurality of surface spreading lines that are parallel and/or transverse (e.g., perpendicular) to one another. For example, the definition of a set of vertices may be performed through determination of the accumulated absolute curvature along one or more columns and/or one or more rows of a raster file providing the terrain data, in various embodiments. Thus, in various embodiments, the set of vertices may be an irregular sampling of the original terrain data, wherein the frequency and/or location of the sampling is determined by the amount of curvature of the surface. Once the set of vertices are defined, the surface mesh may be defined based on the set of vertices. The surface mesh may be provided to one or more user apparatuses (e.g., as part of a digital map tile and/or the like). A user apparatus may use the surface mesh to render a visualization of the surface and/or to perform one or more navigation functions corresponding to at least a portion of the surface. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

Various embodiments of the present invention provide technical solutions to technical problems regarding defining a set of vertices that define a surface mesh for use in rendering a visualization of a surface described by terrain data and/or for use in performing one or more navigation functions corresponding to at least a portion of the surface. Various embodiments provide computationally efficient techniques for defining the set of vertices defining a surface mesh approximating a surface. For example, various embodiments, provide techniques for defining a set of vertices that define a surface mesh that approximates a surface where the techniques are considerably faster and/or less computationally complex than traditional methods for defining a set of vertices based on terrain data. Additionally, various embodiments allow for the defining of a set of vertices of the surface mesh based on (a) a minimizing the size of the file storing the vertices and/or a maximum allowed size for the file storing the vertices, (b) an allowed or maximum error level between the height surface described by the mesh and the surface described by the original terrain data, and/or (c) a zoom level of a visualization corresponding to the surface mesh and an allowed or maximum error level for the zoom level. Thus, various embodiments provide a computationally efficient technique for defining a set of vertices that define a surface mesh that allow for the balancing of file size and error level based on the intended application for the resulting surface mesh. Thus, various embodiments provide technical improvements to the fields of improving computer performance in the defining of a set of vertices defining a surface mesh, rendering and displaying visualizations of terrain data via a user interface, and/or the use of terrain data (e.g., as represented by the surface mesh) in performing one or more navigation functions.

In an example embodiment, terrain data describing a surface is accessed. The terrain data comprises a plurality of positions, each position of the plurality of positions comprises a location and a height. The terrain data comprises (a) a first position comprising a first location and a first height and (b) a second position comprising a second location and a second height. Curvatures of the surface between adjacent positions along the surface are determined. A first curvature between the first position and the second position is a second derivative of a connecting line between the first position and the second position. The plurality of positions comprises multiple positions located on a surface spanning line that is collinear with the connecting line. One or more vertices are defined. A vertex of the one or more vertices is defined by determining an accumulated absolute curvature along a portion of the surface spanning line based on the curvature between points of one or more of the plurality of data points by adding the absolute value of the first curvature to the accumulated absolute curvature, determining whether the accumulated absolute curvature is approximately equal to or greater than a reset value, and when it is determined that the accumulated absolute curvature is approximately equal to or greater than the reset value, defining a vertex at the second position. When it is determined that the accumulated absolute curvature is not approximately equal to or greater than the reset value, an absolute value of a second curvature is added to the accumulated absolute curvature. The second curvature is a second derivative of a connecting line defined by the second position and a third position of the plurality of positions, the third position located on the surface spanning line. The one or more vertices are provided for use in defining a surface mesh, wherein the surface mesh is configured for use in rendering a visualization of the surface via a user interface.

In accordance with an aspect of the present invention, a method for defining one or more vertices for use in defining a surface mesh that approximates and/or represents the surface is provided. In an example embodiment, the method comprises accessing terrain data describing a surface. The terrain data comprises a plurality of positions. Each position of the plurality of positions comprises a location and a height. The terrain data comprises (a) a first position comprising a first location and a first height and (b) a second position comprising a second location and a second height. The method further comprises determining curvatures of the surface between adjacent positions along the surface. A first curvature between the first position and the second position is a second derivative of a connecting line between the first position and the second position. The plurality of positions comprises multiple positions located on a surface spanning line that is collinear with the connecting line. The method further comprises defining one or more vertices. A vertex of the one or more vertices is defined by determining an accumulated absolute curvature along a portion of the surface spanning line based on the curvature between points of one or more of the plurality of data points by adding the absolute value of the first curvature to the accumulated absolute curvature, determining whether the accumulated absolute curvature is approximately equal to or greater than a reset value, and when it is determined that the accumulated absolute curvature is approximately equal to or greater than the reset value, defining a vertex at the second position. When it is determined that the accumulated absolute curvature is not approximately equal to or greater than the reset value, an absolute value of a second curvature is added to the accumulated absolute curvature. The second curvature is a second derivative of a connecting line defined by the second position and a third position of the plurality of positions, where the third position located on the surface spanning line. The method further comprises providing the one or more vertices for use in defining a surface mesh, wherein the surface mesh is configured for use in rendering a visualization of the surface via a user interface.

In an example embodiment, the surface spanning line is a line of constant latitude or a line of constant longitude. In an example embodiment, the first and second positions are adjacent positions along the surface spanning line with no intermediate data points between the first and second data points. In an example embodiment, the method further comprises, when it is determined that the accumulated absolute curvature is approximately equal to or greater than the reset value, resetting the accumulated absolute curvature to zero. In an example embodiment, accessing the terrain data comprises reading a raster file. In an example embodiment, the method further comprises defining one or more vertices based on an edge or a corner of the surface as described by the terrain data. In an example embodiment, the method further comprises defining one or more data cells based on locations of the positions, each cell comprising multiple positions; for each position, determining a curvature metric; identifying an extremum metric position within each cell having the curvature metric indicating a largest curvature within the corresponding data cell; and defining a vertex at the extremum metric position. In an example embodiment, providing one or more vertices comprises providing a data file comprising the one or more vertices. In an example embodiment, the reset value is determined based on one of: (a) a desired data file size, wherein the data file comprises the one or more vertices, (b) a desired estimation error level, or (c) a zoom level corresponding to the visualization. In an example embodiment, the surface mesh is provided to one or more user apparatuses and the one or more user apparatuses are configured to (a) render a visualization of the surface for via a user interface of the user apparatus and/or (b) use the surface mesh to perform one or more navigation functions. In an example embodiment, the method further comprises, when it is determined that the accumulated absolute curvature is approximately equal to or greater than the reset value, defining a second vertex at a location located on a second surface spanning line, the second surface spanning line being parallel to the surface spanning line and the second vertex located at an intersection of the second surface spanning line and a transverse line that is transverse to the surface spanning line and the second surface spanning line.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least access terrain data describing a surface. The terrain data comprises a plurality of positions. Each position of the plurality of positions comprises a location and a height. The terrain data comprises (a) a first position comprising a first location and a first height and (b) a second position comprising a second location and a second height. The computer program code is further configured to, when executed by the at least one processor, cause the apparatus to at least determine curvatures of the surface between adjacent positions along the surface. A first curvature between the first position and the second position is a second derivative of a connecting line between the first position and the second position. The plurality of positions comprises multiple positions located on a surface spanning line that is collinear with the connecting line. The computer program code is further configured to, when executed by the at least one processor, cause the apparatus to at least define one or more vertices. A vertex of the one or more vertices is defined by determining an accumulated absolute curvature along a portion of the surface spanning line based on the curvature between points of one or more of the plurality of data points by adding the absolute value of the first curvature to the accumulated absolute curvature, determining whether the accumulated absolute curvature is approximately equal to or greater than a reset value, and when it is determined that the accumulated absolute curvature is approximately equal to or greater than the reset value, defining a vertex at the second position. The computer program code is configured to, when executed by the at least one processor, cause the apparatus to at least, when it is determined that the accumulated absolute curvature is not approximately equal to or greater than the reset value, add an absolute value of a second curvature to the accumulated absolute curvature. The second curvature is a second derivative of a connecting line defined by the second position and a third position of the plurality of positions, where the third position located on the surface spanning line. The computer program code is further configured to, when executed by the at least one processor, cause the apparatus to at least provide the one or more vertices for use in defining a surface mesh, wherein the surface mesh is configured for use in rendering a visualization of the surface via a user interface.

In an example embodiment, the surface spanning line is a line of constant latitude or a line of constant longitude. In an example embodiment, the first and second positions are adjacent positions along the surface spanning line with no intermediate data points between the first and second data points. In an example embodiment, the computer program code is further configured to, when executed by the at least one processor, cause the apparatus to at least, when it is determined that the accumulated absolute curvature is approximately equal to or greater than the reset value, reset the accumulated absolute curvature to zero. In an example embodiment, accessing the terrain data comprises reading a raster file. In an example embodiment, the computer program code is further configured to, when executed by the at least one processor, cause the apparatus to at least define one or more vertices based on an edge or a corner of the surface as described by the terrain data. In an example embodiment, the computer program code is further configured to, when executed by the at least one processor, cause the apparatus to at least define one or more data cells based on locations of the positions, each cell comprising multiple positions; for each position, determine a curvature metric; identify an extremum metric position within each cell having the curvature metric indicating a largest curvature within the corresponding data cell; and define a vertex at the extremum metric position. In an example embodiment, providing one or more vertices comprises providing a data file comprising the one or more vertices. In an example embodiment, the reset value is determined based on one of: (a) a desired data file size, wherein the data file comprises the one or more vertices, (b) a desired estimation error level, or (c) a zoom level corresponding to the visualization. In an example embodiment, the surface mesh is provided to one or more user apparatuses and the one or more user apparatuses are configured to (a) render a visualization of the surface for via a user interface of the user apparatus and/or (b) use the surface mesh to perform one or more navigation functions. In an example embodiment, the computer program code is further configured to, when executed by the at least one processor, cause the apparatus to at least, when it is determined that the accumulated absolute curvature is approximately equal to or greater than the reset value, defining a second vertex at a location located on a second surface spanning line, the second surface spanning line being parallel to the surface spanning line and the second vertex located at an intersection of the second surface spanning line and a transverse line that is transverse to the surface spanning line and the second surface spanning line.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least access terrain data describing a surface. The terrain data comprises a plurality of positions. Each position of the plurality of positions comprises a location and a height. The terrain data comprises (a) a first position comprising a first location and a first height and (b) a second position comprising a second location and a second height. The computer-executable program code instructions further comprise program code instructions configured to, when executed by a processor of an apparatus, cause the apparatus to at least determine curvatures of the surface between adjacent positions along the surface. A first curvature between the first position and the second position is a second derivative of a connecting line between the first position and the second position. The plurality of positions comprises multiple positions located on a surface spanning line that is collinear with the connecting line. The computer-executable program code instructions further comprise program code instructions configured to, when executed by a processor of an apparatus, cause the apparatus to at least define one or more vertices. A vertex of the one or more vertices is defined by determining an accumulated absolute curvature along a portion of the surface spanning line based on the curvature between points of one or more of the plurality of data points by adding the absolute value of the first curvature to the accumulated absolute curvature, determining whether the accumulated absolute curvature is approximately equal to or greater than a reset value, and when it is determined that the accumulated absolute curvature is approximately equal to or greater than the reset value, defining a vertex at the second position. The computer-executable program code instructions further comprise program code instructions configured to, when executed by a processor of an apparatus, cause the apparatus to at least, when it is determined that the accumulated absolute curvature is not approximately equal to or greater than the reset value, add an absolute value of a second curvature to the accumulated absolute curvature. The second curvature is a second derivative of a connecting line defined by the second position and a third position of the plurality of positions, where the third position located on the surface spanning line. The computer-executable program code instructions further comprise program code instructions configured to, when executed by a processor of an apparatus, cause the apparatus to at least provide the one or more vertices for use in defining a surface mesh, wherein the surface mesh is configured for use in rendering a visualization of the surface via a user interface.

In an example embodiment, the surface spanning line is a line of constant latitude or a line of constant longitude. In an example embodiment, the first and second positions are adjacent positions along the surface spanning line with no intermediate data points between the first and second data points. In an example embodiment, the computer-executable program code instructions further comprise program code instructions configured to, when executed by a processor of an apparatus, cause the apparatus to at least, when it is determined that the accumulated absolute curvature is approximately equal to or greater than the reset value, reset the accumulated absolute curvature to zero. In an example embodiment, accessing the terrain data comprises reading a raster file. In an example embodiment, the computer-executable program code instructions further comprise program code instructions configured to, when executed by a processor of an apparatus, cause the apparatus to at least define one or more vertices based on an edge or a corner of the surface as described by the terrain data. In an example embodiment, the computer-executable program code instructions further comprise program code instructions configured to, when executed by a processor of an apparatus, cause the apparatus to at least define one or more data cells based on locations of the positions, each cell comprising multiple positions; for each position, determine a curvature metric; identify an extremum metric position within each cell having the curvature metric indicating a largest curvature within the corresponding data cell; and define a vertex at the extremum metric position. In an example embodiment, providing one or more vertices comprises providing a data file comprising the one or more vertices. In an example embodiment, the reset value is determined based on one of: (a) a desired data file size, wherein the data file comprises the one or more vertices, (b) a desired estimation error level, or (c) a zoom level corresponding to the visualization. In an example embodiment, the surface mesh is provided to one or more user apparatuses and the one or more user apparatuses are configured to (a) render a visualization of the surface for via a user interface of the user apparatus and/or (b) use the surface mesh to perform one or more navigation functions. In an example embodiment, the computer-executable program code instructions further comprise program code instructions configured to, when executed by a processor of an apparatus, cause the apparatus to at least, when it is determined that the accumulated absolute curvature is approximately equal to or greater than the reset value, defining a second vertex at a location located on a second surface spanning line, the second surface spanning line being parallel to the surface spanning line and the second vertex located at an intersection of the second surface spanning line and a transverse line that is transverse to the surface spanning line and the second surface spanning line.

In still another aspect of the present invention, an apparatus is provided. In an example embodiment, the apparatus comprises means for accessing terrain data describing a surface. The terrain data comprises a plurality of positions and each position of the plurality of positions comprises a location and a height. The terrain data comprises (a) a first position comprising a first location and a first height and (b) a second position comprising a second location and a second height. In an example embodiment, the apparatus comprises means for determining curvatures of the surface between adjacent positions along the surface. A first curvature between the first position and the second position is a second derivative of a connecting line between the first position and the second position. The plurality of positions comprises multiple positions located on a surface spanning line that is collinear with the connecting line. In an example embodiment, the apparatus comprises means for defining one or more vertices. A vertex of the one or more vertices is defined by determining an accumulated absolute curvature along a portion of the surface spanning line based on the curvature between points of one or more of the plurality of data points by adding the absolute value of the first curvature to the accumulated absolute curvature, determining whether the accumulated absolute curvature is approximately equal to or greater than a reset value, and when it is determined that the accumulated absolute curvature is approximately equal to or greater than the reset value, defining a vertex at the second position. When it is determined that the accumulated absolute curvature is not approximately equal to or greater than the reset value, an absolute value of a second curvature is added to the accumulated absolute curvature, wherein the second curvature is a second derivative of a connecting line defined by the second position and a third position of the plurality of positions, the third position located on the surface spanning line. In an example embodiment, the apparatus comprises means for providing the one or more vertices for use in defining a surface mesh, wherein the surface mesh is configured for use in rendering a visualization of the surface via a user interface.

BRIEF DESCRIPTION OF THE DRAWINGS

Figure 1:
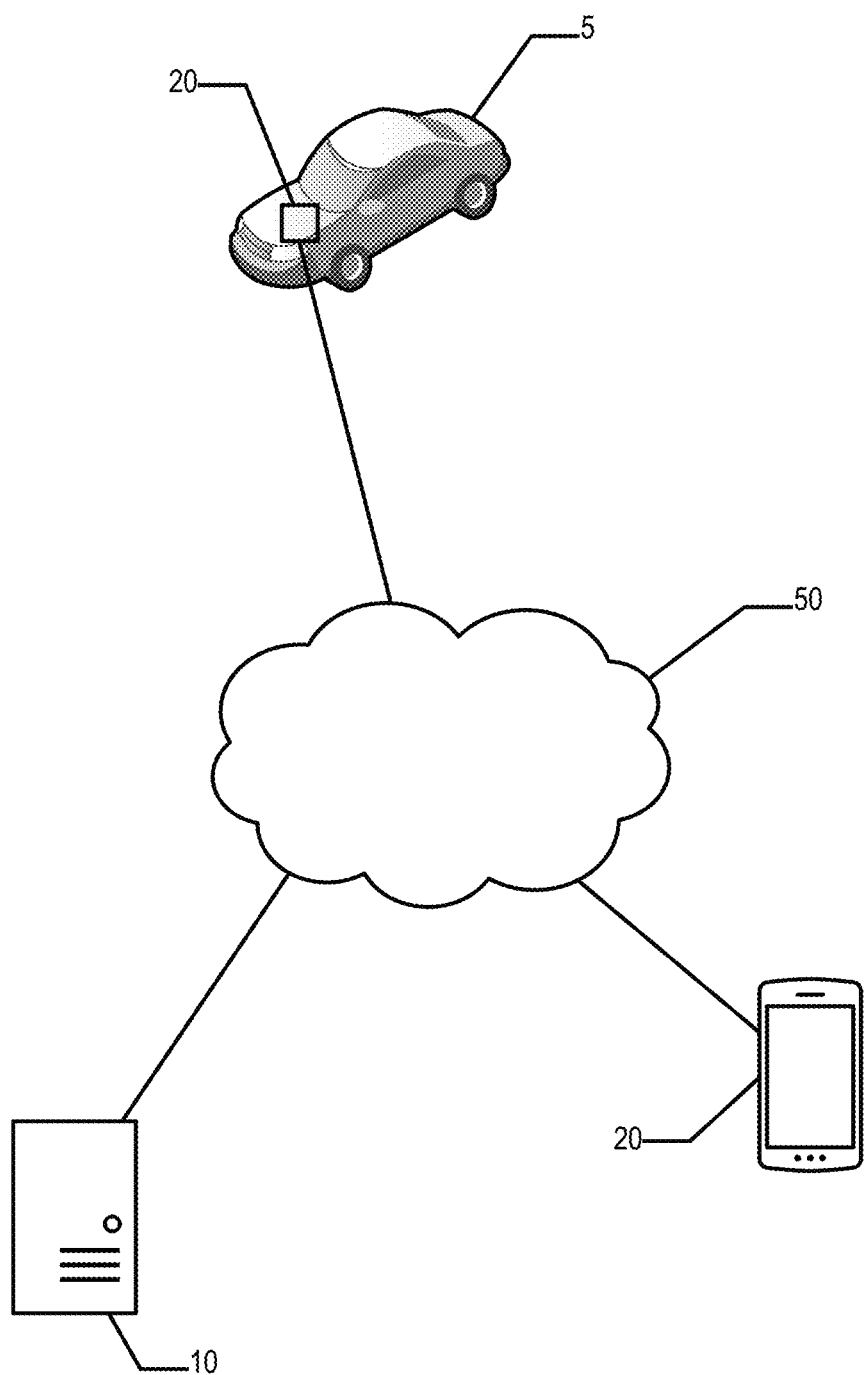
Figure 2A:
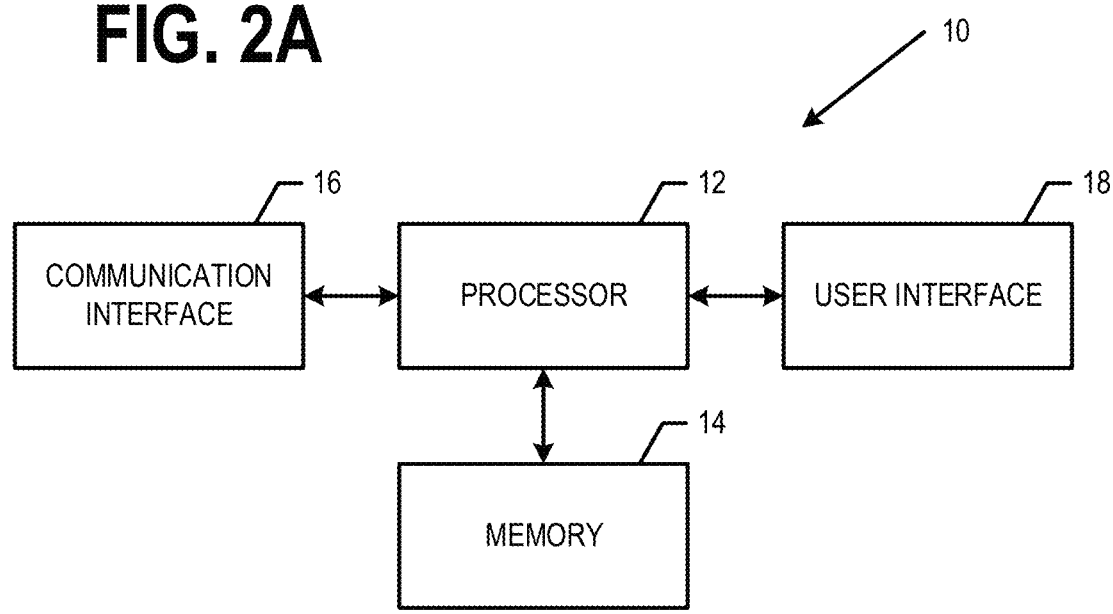
Figure 2B:
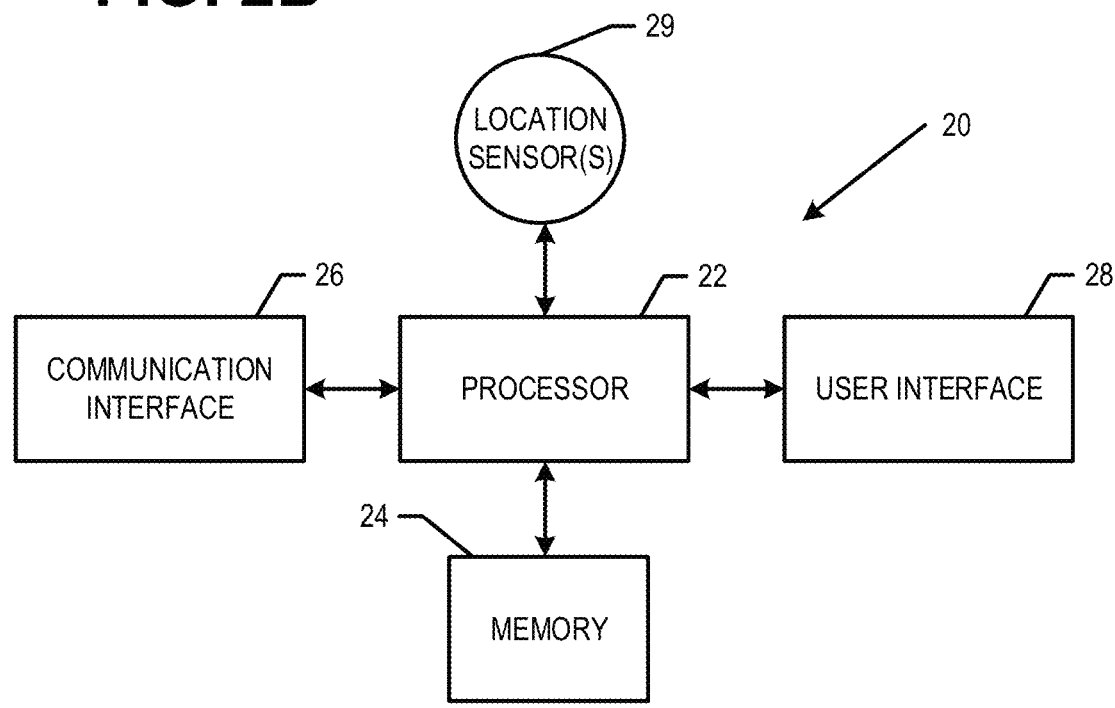
Figure 3A:
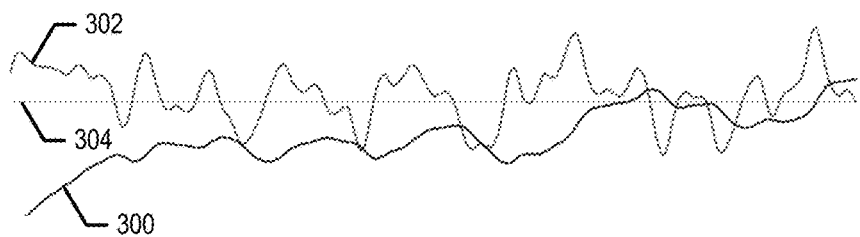
Figure 3B:
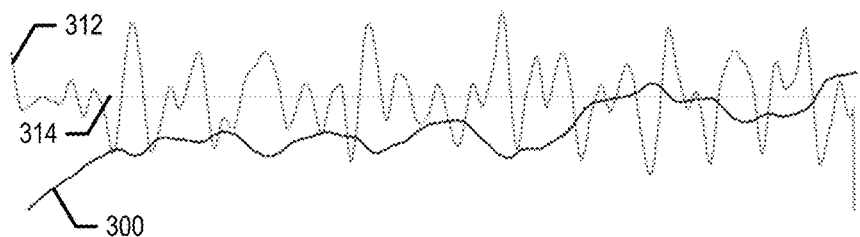
Figure 3C:
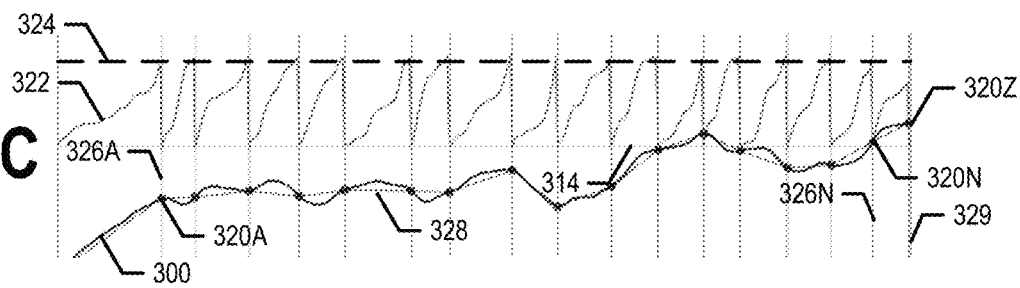
Figure 3D:
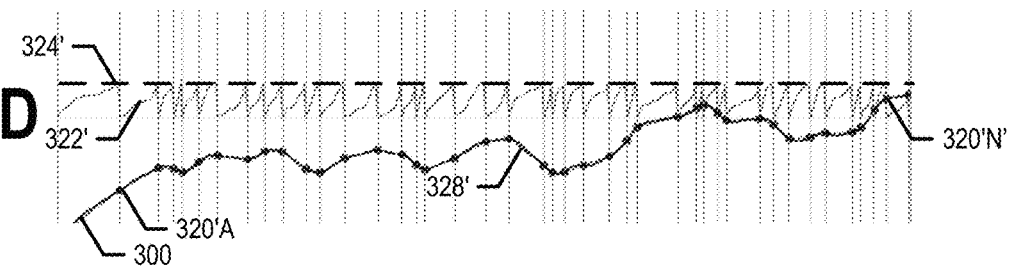
Figure 6:
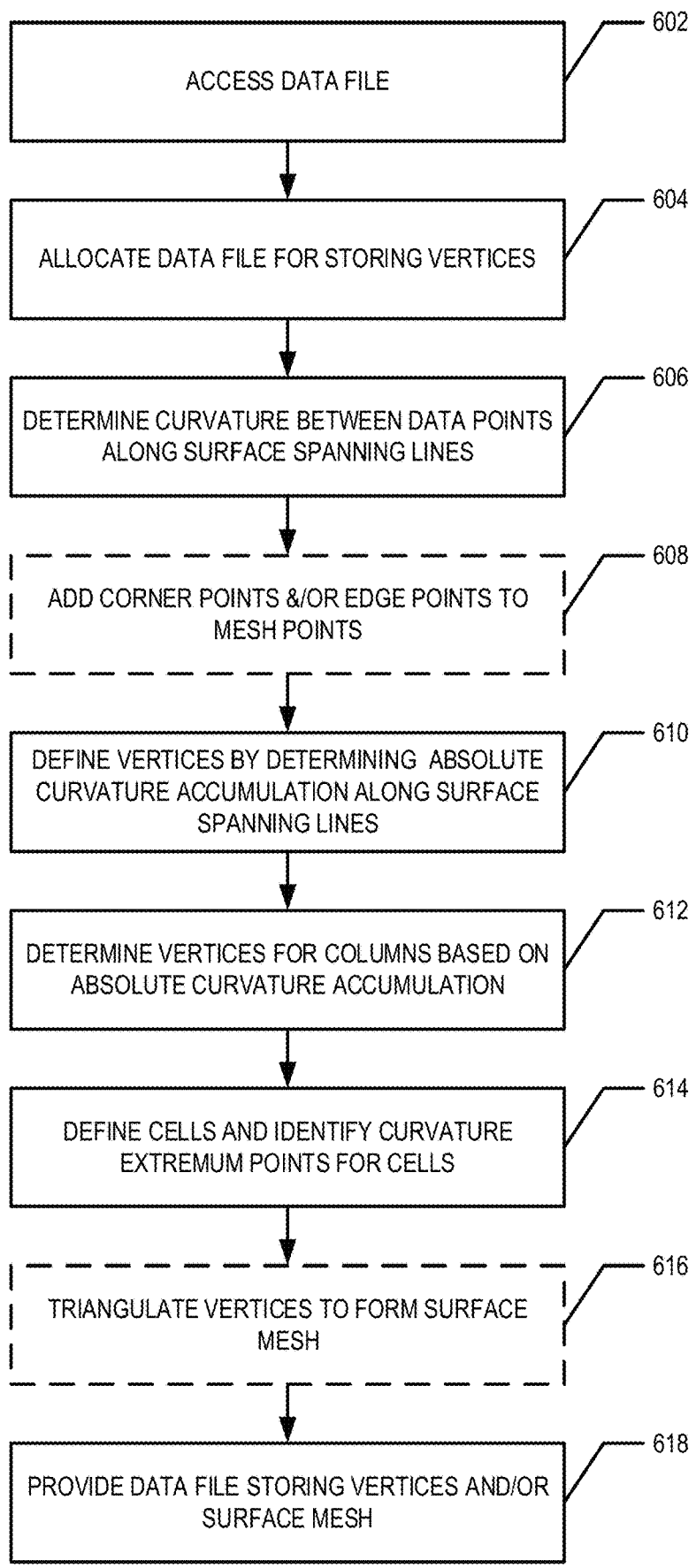

Having thus described certain example embodiments in general terms, reference will hereinafter be made to the accompanying drawings, which are not necessarily drawn to scale, and wherein:

FIG. 1 is a block diagram showing an example architecture of one embodiment;

FIG. 2A is a block diagram of an apparatus that may be specifically configured in accordance with an example embodiment;

FIG. 2B is a block diagram of a user apparatus that may be specifically configured in accordance with an example embodiment;

FIG. 3A illustrates an example of one dimensional terrain data and a first derivative thereof;

FIG. 3B illustrates the example one dimensional terrain data and a second derivative thereof;

FIG. 3C illustrates the example one dimensional terrain data, an accumulated absolute curvature corresponding to the one dimensional terrain data, a set of vertices determined based on the accumulated absolute curvature, and a one dimensional surface approximation determined based on the vertices, in accordance with an example embodiment;

FIG. 3D illustrates the example one dimensional terrain data, another accumulated absolute curvature corresponding to the one dimensional terrain data, another set of vertices determined based on the other accumulated absolute curvature, and a one dimensional surface approximation determined based on the vertices, in accordance with an example embodiment;

FIG. 4 is a flowchart illustrating operations performed, such as by an apparatus of FIG. 2A, to define and provide vertices for approximating one dimensional terrain data, according to an example embodiment;

FIG. 5 provides example pseudocode for defining and providing vertices for approximating one dimensional terrain data, according to an example embodiment; and FIG. 6 is a flowchart illustrating operations performed, such as an apparatus of FIG. 2A, to define and provide vertices for approximating two dimensional terrain data, according to an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines, allowances, tolerances, and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided for defining a set of vertices that define a surface mesh that approximates a surface described by terrain data. In an example embodiment, the terrain data is provided in the form of a raster file. In various embodiments, the surface mesh is defined based on the set vertices. In an example embodiment, the surface mesh is configured for rendering a visualization of surface via a user interface. In an example embodiment, the surface mesh is configured for use in performing one or more navigation functions corresponding to at least a portion of the surface approximated by the surface mesh.

In various embodiments, each of the vertices are defined by determining an accumulated absolute curvature of the surface along one or more surface spanning lines that each span the surface described by the terrain data. In various embodiments, the accumulated absolute curvature is determined by summing the absolute value of the curvature (e.g., second derivative) between data points of the terrain data along a surface spanning line until the accumulated absolute curvature reaches and/or surpasses a reset value. For example, each data point of the terrain data may comprise a position. The position may comprise a location (e.g., x, y coordinates; latitude and longitude; and/or the like) and a height (e.g., elevation, altitude, height above road level, and/or other value corresponding to the location). For example, the location may describe where a point of the surface is located and the height may indicate a height (or other value) of the surface at that point. For example, the location may be the projection of the position onto a flat plane.

When the accumulated absolute curvature being summed across a surface spanning line reaches and/or surpasses the reset value, the position at which the reset value was reached and/or surpassed is used to define a vertex of the set of vertices and the accumulated absolute curvature is reset (e.g., set to zero). The summing of the absolute curvature between positions along the surface spanning line may then resume such that a plurality of vertices may be defined along the surface spanning line (e.g., each time the accumulated absolute curvature reaches and/or surpasses the reset value). Vertices may be defined along a plurality of surface spanning lines that are each parallel and/or transverse (e.g., perpendicular) to other surface spanning lines of the plurality of surface spanning lines. For example, if the terrain data is provided in a raster file, the surface spanning lines may be defined by the columns and/or rows of the raster file. In an example embodiment, the surface spanning lines are lines of constant latitude and/or constant longitude. As used herein, the terms latitude and longitude may refer to latitude and longitude of a standard frame of reference such as the World Geodetic System standard (e.g., WGS84) or the latitude and longitude of another frame of reference. In various embodiments, the latitude and longitude of the frame of reference may be transformed into WGS84 longitude and latitude via a transformation function (e.g., a rotation). For example, standard frame of reference latitude and longitude information may be projected (e.g., using the Mercator projection) into kilometers, miles, meters, yards, and/or other unit of length information for performing the computation. In an example embodiment, additional vertices may be defined based on the edges and/or corners of the surface described by the terrain data.

In an example embodiment, one or more vertices may be defined based on a curvature metric. For example, the surface described by the terrain data may be divided into a plurality of cells and a curvature metric may be determined for each position within a cell. The data point having the most significant curvature metric within the cell may be used to define a vertex. This process may be performed for each cell to define a plurality of vertices based on the curvature metric. In an example embodiment, the cells are a tiling of the surface described by the terrain data. In various embodiments, vertices are defined based on the curvature metric in addition to being defined based on the accumulated absolute curvature along a surface spanning line reaching and/or surpassing the reset value.

In various embodiments, the set of vertices defining the surface mesh are defined by an apparatus. The apparatus may further define a surface mesh based on the set of vertices, in an example embodiment. In various embodiments, the apparatus may provide the surface mesh (e.g., as part of a tile of a digital map, as a portion of a geographic database, and/or the like). A user apparatus may receive the surface mesh and use the surface mesh to render a visualization of the surface (e.g., a visualization approximating the surface), in various embodiments. In an example embodiment, the user apparatus may use the surface mesh to perform on or more navigation functions corresponding to at least a portion the surface. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

FIG. 1 provides an illustration of an example system that can be used in conjunction with various embodiments of the present invention. As shown in FIG. 1, the system may include one or more apparatuses 10, a plurality of user apparatuses 20, one or more networks 50, and/or the like.

In various embodiments, a user apparatus 20, may be a mobile computing device (e.g., a cell phone, mobile phone, smart phone, wearable device such as a smart watch or a heads up display, in vehicle navigation system, and/or the like). In an example embodiment, the user apparatus 20 may comprise one or more applications that, when executed, cause the user apparatus 20 to act as a navigation system and perform one or more navigation functions.

In an example embodiment, the apparatus 10 may be a server, group of servers, distributed computing system, and/or other computing system. For example, the apparatus 10 may be in communication with one or more user apparatuses 20 and/or the like via one or more wired and/or wireless networks 50. In an example embodiment, the apparatus 10 is remotely located with respect to the user apparatus 20.

In an example embodiment, an apparatus 10 may comprise components similar to those shown in the example apparatus 10 diagrammed in FIG. 2A. In various embodiments, the apparatus 10 is configured to receive terrain data (e.g., in the form of a raster file); determine one or more sets of vertices that may be each used to define a surface mesh for approximating a surface defined by the terrain data; provide the set(s) of vertices and/or corresponding surface mesh(es) to one or more user apparatuses; and/or the like. In an example embodiment, the apparatus 10 is configured to define a surface mesh based on a set of vertices. For example, as shown in FIG. 2A, the apparatus 10 may comprise a processor 12, memory 14, a user interface 18, a communications interface 16, and/or other components configured to perform various operations, procedures, functions or the like described herein. In at least some example embodiments, the memory 14 is non-transitory.

In various embodiments, a user apparatus 20 is configured to receive a set of vertices and/or other information/data defining a surface mesh defined based on a set of vertices (e.g., possibly as part of a tile of a digital map and/or a geographic database). In various embodiments, the user apparatus 20 is configured to render and display a visualization of the surface (e.g., an approximation of the surface) via a user interface of the user apparatus 20 and based on the set of vertices and/or the surface mesh defined based on the set of vertices and/or to perform one or more navigation functions based on the set of vertices and/or the surface mesh defined based on the set of vertices. In an example embodiment, as shown in FIG. 2B, the user apparatus 20 may comprise a processor 22, memory 24, a communications interface 26, a user interface 28, and one or more location sensors 29. In an example embodiment, the one or more location sensors 29 may comprise one or more of a GNSS sensor; IMU sensors; radio frequency identification (RFID) receiver or transceiver, and/or the like. In at least some example embodiments, the memory 24 is non-transitory. In various embodiments, the memory 24 may store at least a portion of a geographic database, digital map, and/or the like comprising map information/data.

In an example embodiment, an apparatus 10 may be in communication with one or more user apparatuses 20 and/or other computing entities via one or more wired and/or wireless networks 50. For example, each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network (e.g., 5G, 4G, LTE, 3G, and/or the like), short and/or medium range communications, fiber to wireless, Wi-Fi, radio data system (RDS) messages over the air radio interface, transport protocol experts group (TPEG) service by connected HyperText Transfer Protocol (HTTP) or User Datagram Protocol (UDP), and/or the like and/or combinations thereof. In some embodiments, a network 50 may comprise the automotive cloud, digital transportation infrastructure (DTI), radio data system (RDS)/high definition (HD) radio or other digital radio system, and/or the like. For example, a user apparatus 20 may be in communication with an apparatus 10 via the network 50. For example, an apparatus 10 may communicate with a user apparatus 20 via a network, such as the Cloud. For example, the Cloud may be a computer network that provides shared computer processing resources and data to computers and other devices connected thereto. In another example, a user apparatus 20 may be configured to receive communications (e.g., a notification comprising autonomous driving instructions) via a short and/or mid-range communication protocol.

Certain example embodiments of the apparatus 10 and/or user apparatus 20, are described in more detail below with respect to FIGS. 2A and 2B.

II. Example Operation

Methods, apparatus, systems, and computer program products are provided for defining one or more sets of vertices that, when used to generate a surface mesh, provide an approximation of a surface described by terrain data. For example, terrain data often comprises a plurality of positions. Each position comprises a location (e.g., in a one-dimensional space, two-dimensional space, and/or the like) and a height or other value corresponding to the location. For example, the terrain data may be provided as a raster file. In general, the terrain data is too densely populated for efficient processing or rendering by graphics processing hardware (e.g., a central processing unit (CPU), graphics processing unit (GPU), and/or the like). Thus, for rendering purposes, a surface mesh approximating the surface is often defined based on the terrain data. The process of generating a surface mesh generally comprises defining a set of vertices based on the terrain data, which can be used to generate and/or define the surface mesh. Traditional processes for defining the set of vertices tend to be slow and/or computationally complicated. Various embodiments of the present invention provide an improvement to the art by providing techniques for defining a set of vertices and/or a corresponding surface mesh for use in rendering an approximation of a surface or for performing one or more navigation functions related to at least a portion of the surface that is computationally efficient and that can be adjusted to provide a balance of file size and approximation error level that is appropriate for a variety of applications.

Various embodiments will now be described in relation to a one-dimensional example (e.g., the location of each data point is provided by one coordinate). Various embodiments are further described with regard to two-dimensions (e.g., the location of each data point is provided by two coordinates).

Defining a Set of Vertices for Surface Corresponding to a One Dimensional Space

FIG. 3A illustrates an example one-dimensional surface or line 300 described by terrain data and the first derivative 302 of the one-dimensional surface or line 300. FIG. 3A also shows the zero line 304 of the first derivative 302 (e.g., the level at which the first derivative 302 equals zero). FIG. 3B illustrates the one-dimensional surface or line 300 and the second derivative or curvature 312 of the one-dimensional surface or line 300. FIG. 3B also shows the zero line 314 of the second derivative or curvature 312 (e.g., the level at which the second derivative or curvature 312 equals zero).

FIGS. 3C and 3D each illustrate an example embodiment of defining a set of vertices (e.g., comprising vertices 320A, . . . , 320N in FIG. 3C and comprising vertices 320'A, . . . , 320'N' in FIG. 3D). FIGS. 3C and 3D show a reset value line 324, 324', illustrating the reset value, and an accumulated absolute curvature 322, 322'. In the one dimensional example, the one-dimensional surface and/or line 300 itself is the surface spanning line corresponding to the one-dimensional surface and/or line 300. The accumulated absolute curvature 322, 322' is determined by summing the absolute value of the second derivative or curvature 312 across the one-dimensional surface or line 300 (e.g., the surface spanning line) and, each time the accumulated absolute curvature 322, 322' reaches and/or surpasses the reset value, as illustrated by the reset value line 324, 324', a vertex (e.g., 320A, . . . , 320N, 320'A, . . . , 320'N') is defined and the accumulated absolute curvature 322, 322' is reset. For example, $$S(x) = \sum_{p=x_s}^{x} |H''(p)|,$$

where $x_s$ is the starting position, $H''(p)$ is the second derivative or curvature 312 at location p, and $S(x)$ is the accumulated absolute curvature at location x. When $S(x)$ reaches or surpasses the reset value, a vertex 320 is defined, $x_s$ is reset to the current x value, and $S(x)$ is reset to zero.

In an example embodiment, one or more edge vertices 320Z may be defined at one or more edges 329 of the one-dimensional surface or line 300. For example, one or more edge vertices 320Z located on the edge of the surface may be added to the set of vertices defined based on the accumulated absolute curvature. The set of vertices (e.g., 320A, . . . , 320N, 320Z or 320'A, . . . , 320'N') define a surface mesh 328, 328' that approximates the one dimensional surface or line 300.

As can be seen by comparing FIGS. 3C and 3D, changing the reset value has a direct impact on the number of vertices 320, 320' defined and therefore affects the file size of any file used to store information/data identifying the set of vertices 320, 320'. As can also be seen by comparing FIGS. 3C and 3D, changing the reset value has a direct impact on the quality and/or error level of the surface mesh in approximating the surface. For example, surface mesh 328' is generated using a smaller reset value than the surface mesh 328. The surface mesh 328' is defined using a larger set of vertices 320' than the surface mesh 328 and the surface mesh 328' better approximates (e.g., has a lower error level) the one-dimensional surface or line 300 than the surface mesh 328. Thus, the reset value may be adjusted and/or defined based on the application to provide a computationally quick and efficient technique for defining a set of vertices that corresponds to an appropriate file size and appropriate quality and/or error level for the application.

FIG. 4 provides a flowchart illustrating operations performed, such as by an apparatus 10, to define and provide a set of vertices for approximating a surface corresponding to a one-dimensional space (e.g., a line) described by terrain data, according to an example embodiment. For example, the terrain data comprises positions located on the surface and each position comprises a one-dimensional (e.g., one coordinate) location and a height. FIG. 5 provides pseudo-code corresponding to at least some of the operations described with respect to FIG. 4. For example, execution of the pseudocode illustrated in FIG. 5 by processor 12 may cause the apparatus 10 to perform various operations described with respect to FIG. 4.

Starting at block 402, the terrain data is accessed. For example, the apparatus 10 may access the terrain data. For example, the apparatus 10 may comprise means, such as processor 12, memory 14, communication interface 16, and/or the like, for accessing the terrain data. In an example embodiment, the terrain data comprises a plurality of positions. Each position comprises a location and a height or other value corresponding to the location. For example, the position may be a point on the surface, the location may be a projection of the point on the surface into a one-dimensional or two-dimensional flat space (as appropriate for the application), and the height describes a value corresponding to the surface at the location (e.g., the height of the surface above/below the flat space at the location). In an example embodiment, each location corresponds to only one position on the surface. For example, the height $h_i$ provides a mapping from the location $x_i$ in a flat space to a position $p_i$ on the surface. In an example embodiment, a data file comprising the terrain data (e.g., a raster file) may be read in order to access the terrain data. For example, lines 501-504 of FIG. 5 show the initializing and/or defining of the reset value and an empty vertex array configured for storing the set of vertices as each of the vertices are defined, the reading and/or accessing of the terrain data, and defining of the number of positions of the terrain data N. As shown in lines 505-510 of FIG. 5, a location array and a corresponding height array are defined by reading in the positions of the terrain data.

Continuing with block 404 of FIG. 4, the curvature or second derivative value between adjacent and/or neighboring positions. In an example embodiment, adjacent and/or neighboring position are positions that are immediately adjacent to one another such that there are no intermediary positions directly between the adjacent and/or neighboring positions along the corresponding surface spanning line. For example, the apparatus 10 may determine, compute, calculate, and/or the like the curvature or second derivative value between adjacent and/or neighboring locations along one or more surface spanning lines of the accessed and/or read terrain data. For example, the apparatus 10 may comprise means, such as processor 12, memory 14, and/or the like, for determining, computing, calculating, and/or the like the curvature or second derivative value between adjacent and/or neighboring locations along one or more surface spanning lines of the accessed and/or read terrain data. Various embodiments employ a variety of techniques known in the art for determining the curvature or second derivative value of a line along a surface between two adjacent and/or neighboring positions on the surface. For example, the curvature or second derivative value between a first position and an adjacent and/or neighboring second position along a first surface spanning line provides a description of how much the slope of the surface changes along the first surface spanning line between the first position and second position. For example, lines 511-515 of the pseudocode provided in FIG. 5 illustrate the determination of the curvature or second derivative between adjacent and/or neighboring positions on the surface along a surface spanning line, as described by the terrain data. As should be understood, the curvature or second derivative along a line on the surface between a first position and second position is equivalent to the curvature or second derivative along a line on the surface between a first location and a second location, where the first location corresponds to the first position (and/or is mapped to the first position based on the corresponding height) and the second location corresponds to the second position (and/or is mapped to the second position based on the corresponding height).

At block 406 of FIG. 4, the accumulated absolute curvature is determined along a surface spanning line across the surface. In the example of a one-dimensional surface (e.g., one-dimensional surface and/or line 300), the accumulated absolute curvature is determined along the line 300 of the one-dimensional surface. For example, the apparatus 10 may determine and/or compute the accumulated absolute curvature along a surface spanning line across the surface (e.g., along the line 300 of the one-dimensional surface). For example, the apparatus 10 may comprise means, such as processor 12, memory 14, and/or the like for determining and/or computing the accumulated absolute curvature along a surface spanning line across the surface (e.g., along the line 300 of the one-dimensional surface). At each position $x_i$, the accumulated absolute curvature is determined and/or computed by determining $$S(x_i) = \sum_{x_s}^{x_i} |H''(x)|,$$

where $S(x_i)$ is the accumulated absolute curvature at a position corresponding to location $x_i$ and $H''(x)$ is the curvature or second derivative between adjacent and/or neighboring positions and/or locations for positions and/or locations between the start location $x_s$ and $x_i$. For example, lines 516-524 of FIG. 5 illustrate various aspects of determining the curvature or second derivative along a surface spanning line across the surface (e.g., line 300 in the one-dimensional surface example).

At each position/location $x_i$ where the accumulated absolute curvature $S(x_i)$ reaches or surpasses (e.g., is approximately equal to or greater than) the reset value, a vertex is defined at the position $(x_i, h_i)$ and the accumulated absolute curvature is reset to zero. For example, a new sum is started with $x_s$ equal to $x_i$, as illustrated in FIGS. 3C and 3D. For example, at block 408 of FIG. 4, it is determined if $S(x_i)$ is greater than or approximately equal to (e.g., has reached and/or surpassed) the reset value. For example, the apparatus 10 may determine whether $S(x_i)$ is greater than or approximately equal to (e.g., has reached and/or surpassed) the reset value. For example, the apparatus 10 may comprise means, such as processor 12, memory 14, and/or the like, for determining whether $S(x_i)$ is greater than or approximately equal to (e.g., has reached and/or surpassed) the reset value.

When it is determined that $S(x_i)$ is not greater than or approximately equal to (e.g., has reached and/or surpassed) the reset value, the process continues to block 410, where the index i is iterated, and then the process continues to block 406 to determine $S(x_i)$ for the new value of index i. When it is determined that $S(x_i)$ is greater than or approximately equal to (e.g., has reached and/or surpassed) the reset value, the process continues to block 412. At block 412, a vertex at $(x_i, h_i)$, corresponding to the position $p_i$, is added to the set of vertices (e.g., a vertex array), the accumulated absolute curvature is reset (e.g., reset to zero), and the index i is incremented. For example, the apparatus 10 may add a vertex at $(x_i, h_i')$, corresponding to the position $p_i$, to the vertex array, reset the accumulated absolute curvature, and increment the index i. In an example embodiment, the height $h_i'$ is the height $h_i$. In an example embodiment, the height $h_i'$ is determined based on the height $h_i$ through, for example, an interpolation process configured to reduce the error level of the resulting surface mesh in approximating the surface described by the terrain data. For example, the apparatus 10 may comprise means, such as processor 12, memory 14, and/or the like, for adding a vertex at $(x_i, h_i)$, corresponding to the position $p_i$, to the vertex array, resetting the accumulated absolute curvature, and incrementing the index i. In an example embodiment, the vertex array is written to a data file (e.g., a raster file). For example, lines 519-523 of FIG. 5 correspond to blocks 408-412 of FIG. 4, in an example embodiment. The process may then continue to block 414 of FIG. 4.

At block 414, it is determined whether all data points have been considered. For example, the apparatus 10 may determine whether all data points have been considered. For example, the apparatus 10 may comprise means, such as processor 12, memory 14, and/or the like, for determining whether all data points (e.g., all of the data points along the surface spanning line) have been considered. For example, it may be determined if the index i=N−1, where N is the number of positions that describe the one-dimensional surface in the accessed and/or read terrain data. If all data points have been considered (e.g., index i=N−1), the process continues to block 416. If all data points have not been considered (e.g., index i<N−1), the process returns to block 406.

At optional block 416 of FIG. 4, one or more edge vertices are defined based on edge positions of the surface described by the accessed and/or read terrain data. For example, the apparatus 10 may define one or more edge vertices based on edge positions of the surface described by the accessed and/or read terrain data. For example, the apparatus 10 may comprise means, such as processor 12, memory 14, and/or the like, for defining one or more edge vertices based on edge positions of the surface described by the accessed and/or read terrain data. For example, the first position (e.g. farthest left point of curvature 322, 322' and/or position $(x_0, h_0)$) may be used to define an edge vertex. For example, the final position (e.g., the farthest right point of curvature 322, 322' and/or position $(x_{(N-1)}, h_{(N-1)})$) may be used to define an edge vertex (e.g., 320Z). For example, lines 525-526 of the pseudocode illustrated in FIG. 5 show the defining of edge vertices based on the edges of the surface defined by the terrain data.

At block 418, set of vertices (e.g., the vertex array) is provided. For example, the apparatus 10 may provide the set of vertices, for example, in the form of a vertex array. For example, the apparatus 10 may comprise means, such as processor 12, memory 14, communication interface 16, user interface 18, and/or the like for providing the set of vertices. In various embodiments, the set of vertices are provided as a vertex array stored in a data file. In an example embodiment, the set of vertices are provided in a raster file. In an example embodiment, the providing of the set of vertices comprises storing the set of vertices (e.g., a data file comprising the set of vertices) in memory 14, providing the set of vertices as input to an application or program operating on the apparatus 10 that is configured to define a surface mesh based on the set of vertices (e.g., using Delaunay triangulation, and/or the like), transmitting the set of vertices (e.g., a data file comprising the set of vertices) via communication interface 16 (e.g., such that another apparatus 10 or user apparatus 20 receives the set of vertices), and/or the like. For example, line 527 of the pseudocode shown in FIG. 5 illustrates the providing of the set of vertices as a vertex array.

Defining a Set of Vertices for Surface Corresponding to a Two-Dimensional Space

FIG. 6 provides a flowchart illustrating operations performed, such as by an apparatus 10, to define and provide vertices for approximating a surface corresponding to a two-dimensional space (e.g., a plane) described by terrain data, according to an example embodiment. For example, the terrain data comprises positions located on the surface and each position comprises a two-dimensional (e.g., defined by two coordinates) location and a height.

Starting at block 602, the terrain data is accessed. For example, the apparatus 10 may access the terrain data. For example, the apparatus 10 may comprise means, such as processor 12, memory 14, communication interface 16, and/or the like, for accessing the terrain data. In an example embodiment, the terrain data comprises a plurality of positions. Each position comprises a location and a height or other value corresponding to the location. For example, the position may be a point on the surface, the location may be a projection of the point on the surface into a one-dimensional or two-dimensional flat space (as appropriate for the application), and the height describes a value corresponding to the surface at the location (e.g., the height of the surface above/below the flat space at the location). For example, the location may be provided in latitude and longitude. In an example embodiment, each location corresponds to only one position on the surface. For example, the height $h_i$ provides a mapping from the location $x_i$ in a flat space to a position $p_i$ on the surface. In an example embodiment, a data file comprising the terrain data (e.g., a raster file) may be read in order to access the terrain data. In various embodiments, the terrain data is provided as a two dimensional array and/or a data file comprising rows and columns. Each row and each column defines a surface spanning line that spans the surface from one edge of the surface described by the terrain data to an opposite edge of the surface. For example, the projection of the surface spanning line onto the flat space corresponding to the locations of the terrain data positions may be a straight line that spans the flat space. In an example embodiment, the terrain data is provided as a raster file comprising rows and columns of positions and/or heights corresponding to positions. In an example embodiment, the locations are provided in latitude and longitude with the rows of positions correspond to positions having the same longitude and the columns of positions correspond to positions having the same latitude, or vice versa (e.g., the rows of positions may correspond to positions having the same latitude and the columns of positions may correspond to positions having the same longitudes).

At block 604, a data file, raster file, vertex array, memory space/address and/or the like is allocated for storing the set of vertices to be defined. For example, the apparatus 10 may allocate a data file, raster file, vertex array, memory space/address for storing the set of vertices. For example, the apparatus 10 may comprise means, such as processor 12, memory 14, and/or the like, for allocating a data file, raster file, vertex array, memory space/address for storing the set of vertices.

At block 606, the curvature or second derivative value between adjacent and/or neighboring positions along one or more surface spanning lines (e.g., along the rows and/or columns of the terrain data) are determined. In an example embodiment, adjacent and/or neighboring positions along a surface spanning line are positions that are immediately adjacent to one another such that there are no intermediary positions directly between the adjacent and/or neighboring positions along the surface spanning line. For example, the apparatus 10 may determine, compute, calculate, and/or the like the curvature or second derivative value between adjacent and/or neighboring locations along the surface spanning lines (e.g., along the rows and/or columns of the terrain data) of the accessed and/or read terrain data. For example, the apparatus 10 may comprise means, such as processor 12, memory 14, and/or the like, for determining, computing, calculating, and/or the like the curvature or second derivative value between adjacent and/or neighboring locations of the accessed and/or read terrain data along the rows of the terrain data and along the columns of the terrain data. Various embodiments employ a variety of techniques known in the art for determining the curvature or second derivative value of a line along a surface between two adjacent and/or neighboring positions on the surface. In an example embodiment, the convolution kernel $$\text{kernel}_{column\text{-}wise} = \begin{bmatrix} 0.5 & -1 & 0.5 \\ 1 & -2 & 1 \\ 0.5 & -1 & 0.5 \end{bmatrix}$$

is used for determining the curvature or second derivative between adjacent and/or neighboring positions along columns of the terrain data and the convolution kernel $$\text{kernel}_{row\text{-}wise} = \begin{bmatrix} 0.5 & 1 & 0.5 \\ -1 & -2 & -1 \\ 0.5 & 1 & 0.5 \end{bmatrix}$$

is used for determining the curvature or second derivative between adjacent and/or neighboring positions along rows of the terrain data. For example, the curvature or second derivative value between a first position and an adjacent and/or neighboring second position along a surface spanning line provides a description of how much the slope of the surface changes along the surface spanning line between the first position and second position.

At block 608, one or more edge and/or corner vertices are optionally defined. For example, the apparatus 10 may define one or more edge and/or corner vertices. For example, the apparatus 10 may comprise means, such as processor 12, memory 14, and/or the like for defining one or more edge and/or corner vertices. For example, one or more vertices may be defined and/or added to the data file, vertex array, and/or the like that are each located on a corner and/or edge of the surface described by the terrain data. In an example embodiment, a vertex is defined based on each position along the edges of the surface described by the terrain data. In an example embodiment, a vertex is defined based on one or more positions along each edge or one or more of the edges of the surface described by the terrain data. For example, edge vertex 320Z is defined based on the position located at the edge 329 of the line 300, shown in FIG. 3C. For example, if position $p_z=(x_z, h_z)$ is located on an edge of the surface described by the terrain data, an edge vertex may be defined as $(x_z, h_z)$. For example, an edge vertex may be defined based on the first position of a row or column of the terrain data and/or the last position of a row or column of the terrain data.

At block 610, the vertices are defined based on determining the accumulated absolute curvature along surface spanning lines that span the surface (e.g., the rows and/or columns of the terrain data). In various embodiments, the surface spanning lines may comprise one or more parallel lines and/or one or more transverse lines (e.g., perpendicular lines). In the example of a surface corresponding to a two-dimensional space (e.g., the locations $x_i$ define a plane), the accumulated absolute curvature is determined along surface spanning lines corresponding to the columns and surface spanning lines corresponding to the rows of the terrain data. Vertices are defined based on the accumulated absolute curvature determined along each row and/or a subset of the rows and/or vertices are defined based on the accumulated absolute curvature determined along each column and/or a subset of the columns. For example, the apparatus 10 may determine and/or compute the accumulated absolute curvature along surface spanning lines spanning the surface (e.g., along the rows and/or columns of the terrain data) to define vertices. For example, the apparatus 10 may comprise means, such as processor 12, memory 14, and/or the like for determining and/or computing the accumulated absolute curvature along surface spanning lines spanning the surface (e.g., along the rows and/or columns of the terrain data) to define the vertices. For example, along each surface spanning line (e.g., row or column of the terrain data), the vertices may be defined as described above with respect to FIGS. 4 and 5. For example, the positions along each surface spanning line (e.g., row or column of the terrain data) may be treated as a surface corresponding to a one-dimensional space (e.g., the locations of positions along the surface spanning line define a line). For example, at each position $x_i$ along the surface spanning line, the accumulated absolute curvature is determined and/or computed by determining $S(x_i) = \Sigma_{x_s}^{x_i} |H''(x)|$, where $S(x_i)$ is the accumulated absolute curvature at a position corresponding to location $x_i$ and $H''(x)$ is the curvature or second derivative between adjacent and/or neighboring positions and/or locations for positions and/or locations between the start location $x_s$ and $x_i$ and positioned along the surface spanning line (e.g., row or column). In an example embodiment, the location $x_i$ comprises a latitude and longitude.

At each position/location $x_i$ where the accumulated absolute curvature $S(x_i)$ reaches or surpasses (e.g., is approximately equal to or greater than) the reset value, a vertex is defined at the position $(x_i, h_i)$ and the accumulated absolute curvature is reset to zero. For example, a new sum is started with $x_s$ equal to $x_i$, as illustrated in FIGS. 3C and 3D. For example, at block 408 of FIG. 4, it is determined if $S(x_i)$ is greater than or approximately equal to (e.g., has reached and/or surpassed) the reset value. For example, the apparatus 10 may determine whether $S(x_i)$ is greater than or approximately equal to (e.g., has reached and/or surpassed) the reset value. For example, the apparatus 10 may comprise means, such as processor 12, memory 14, and/or the like, for determining whether $S(x_i)$ is greater than or approximately equal to (e.g., has reached and/or surpassed) the reset value.

When it is determined that $S(x_i)$ is not greater than or approximately equal to (e.g., has reached and/or surpassed) the reset value, the index i is iterated, and then the accumulated absolute curvature $S(x_i)$ is determined for the new value of index i. When it is determined that $S(x_i)$ is greater than or approximately equal to (e.g., has reached and/or surpassed) the reset value, a vertex at $(x_i, h_i)$, corresponding to the position $p_i$, is defined and/or added to the set of vertices (e.g., a vertex array and/or raster file), the accumulated absolute curvature is reset (e.g., reset to zero), and the index i is incremented. For example, the apparatus 10 may add a vertex at $(x_i, h_i')$, corresponding to the position $p_i$, to the vertex array, reset the accumulated absolute curvature, and increment the index i. In an example embodiment, the height $h_i'$ is the height $h_i$. In an example embodiment, the height $h_i'$ is determined based on the height $h_i$ through, for example, an interpolation process configured to reduce the error level of the resulting surface mesh in approximating the surface described by the terrain data. For example, the apparatus 10 may comprise means, such as processor 12, memory 14, and/or the like, for adding a vertex at $(x_i, h_i')$, corresponding to the position $p_i$, to the set of vertices, resetting the accumulated absolute curvature, and incrementing the index i.

After defining the vertex at $(x_i, h_i')$, it is determined whether all the positions along the surface spanning line (e.g., row or column of the terrain data) have been considered. For example, the apparatus 10 may determine whether all the positions along the surface spanning line (e.g., row or column of the terrain data) have been considered. For example, the apparatus 10 may comprise means, such as processor 12, memory 14, and/or the like, for determining whether all the positions along the surface spanning line (e.g., row or column of the terrain data) have been considered. For example, it may be determined if the index i=N−1, where N is the number of positions along the surface spanning line (e.g., the number of positions in the row or column). If all the positions along the surface spanning line (e.g., row or column of the terrain data) have not been considered (e.g., index i<N−1), the process returns to determining the accumulated absolute curvature along the surface spanning line (e.g., row or column of the terrain data). If all the positions along the surface spanning line (e.g., row or column of the terrain data) have been considered (e.g., index i=N−1), the process continues to determining the accumulated absolute curvature and defining vertices based thereon along another surface spanning line (e.g., row or column of the terrain data) until each of the surface spanning lines (e.g., rows and/or columns) have been considered.

In an example embodiment, each surface spanning line (e.g., row or column of the terrain data) is considered individually when determining the accumulated absolute curvature and defining vertices based thereon along the surface spanning line. For example, the vertices along a surface spanning line are defined independently of any other surface spanning line, in an example embodiment. In an example embodiment, the vertices along M surface spanning lines are determined in parallel and/or in concert. For example, the M surface spanning lines may each be parallel to the other surface spanning lines of the M surface spanning lines (e.g., rows are considered with other rows and columns are considered with other columns). In an example embodiment, the M surface spanning lines are adjacent and/or neighboring surface spanning lines of the surface. For example, if a first surface spanning line and a second surface spanning line are both in the M surface spanning lines, any surface spanning line located intermediate and/or between the first and second surface spanning lines is also included in the M surface spanning lines. In an example embodiment, when considering M surface spanning lines in parallel, if the accumulated absolute curvature along one of the M surface spanning lines reaches and/or surpasses the reset value, a vertex is defined at a corresponding position along each of the M surface spanning lines and/or the accumulated absolute curvature along each of the M surface spanning lines is reset (e.g., reset to zero). In various embodiments, a first position on a first surface spanning line corresponds to a second position on a second surface spanning line that is parallel to the first surface spanning line if a line that is perpendicular to both the first surface spanning line and the second surface spanning line connects the first position and the second position. In an example embodiment, all of the columns of the terrain data may not be considered until all of the rows of the terrain data have been considered, or vice versa. When the second set of surface spanning lines are considered (e.g., the second of the columns or the rows), if a vertex was defined at a position along a surface spanning line when the first set of surface spanning lines were considered, a vertex may be defined and/or the accumulated absolute curvature along each of the M surface spanning lines is reset (e.g., reset to zero) at a position corresponding to the vertex that was previously defined. In an example embodiment, M=3.

At block 614, the terrain data is divided into cells and curvature extremum positions are identified in the cells. For example, the apparatus 10 may divide the terrain data into cells and identify curvature extremum positions within the cells. For example, the apparatus 10 may comprise means, such as processor 12, memory 14, and/or the like, for dividing the terrain data into cells and identifying curvature extremum positions within the cells. For example, the terrain data may be divided into a plurality of cells. For each position within the cell, a curvature metric is determined. In an example embodiment, the curvature metric C at position $p_i$ is $C(p_i)=c_r(p_i)^2+c_c(p_i)^2$, where $c_r(p_i)$ is the curvature or second derivative of the surface, as described by a corresponding row of the terrain data, at position $p_i$ and $c_c(p_i)$ is the curvature or second derivative of the surface, as described by a corresponding column of the terrain data, at position $p_i$. In another example, the curvature metric C at position $p_i$ may be $C(p_i)=|c_r(p_i)|+|c_c(p_i)|$. Various other curvature metrics may be used, in various embodiments. In an example embodiment, a vertex is defined based on the position within each cell that has the largest curvature metric C (e.g., the curvature metric indicating the greatest amount of curvature) within the cell. For example a vertex may be defined at position $p_i=(x_i, h_i)$ for the position $p_i$ having $C(p_i)=\max(C(p_j))$ for positions $p_j$ within the cell.

Thus, a set of vertices may be defined that includes edge and/or corner vertices, vertices defined based the accumulated absolute curvature along a surface spanning line reaching and/or surpassing a reset value, and/or positions identified as being curvature extremum positions within cells of the terrain data (e.g., based on a curvature metric). In various embodiments, the set of vertices provides an irregular sampling of the surface as described by the terrain data, where the local sampling rate is determined based on the curvature of the surface itself At block 616, the defined set of vertices may be used to define and/or generate a surface mesh. For example, the apparatus 10 may define and/or generate a surface mesh based on the set of vertices. For example, the apparatus 10 may comprise means, such as processor 12, memory 14, and/or the like for defining and/or generating a surface mesh based on the set of vertices. For example, the set of vertices may be provided as input to an application or program operating on the apparatus 10 that is configured to definite and/or generate a surface mesh based on the set of vertices (e.g., using Delaunay triangulation, and/or the like). For example, the surface mesh may be a triangular mesh, such as a TIN. The set of vertices and/or the surface mesh may be stored to a data file (e.g., a raster file) stored in memory 14, in an example embodiment.

At block 618, the set of vertices and/or the surface mesh is provided. For example, the apparatus 10 may provide the set of vertices, for example, in the form of a vertex array (e.g., a raster file) and/or may provide information/data defining the surface mesh. For example, the apparatus 10 may comprise means, such as processor 12, memory 14, communication interface 16, user interface 18, and/or the like for providing the set of vertices and/or surface mesh. In various embodiments, the set of vertices are provided as a vertex array stored in a data file. In an example embodiment, the set of vertices and/or information/data defining the surface mesh are provided in a raster file. In an example embodiment, the providing of the set of vertices comprises transmitting the set of vertices and/or surface mesh (e.g., a data file comprising the set of vertices and/or information/data defining the surface mesh) via communication interface 16 (e.g., such that another apparatus 10 or user apparatus 20 receives the set of vertices), and/or the like. In an example embodiment, the set of vertices and/or surface mesh may be stored as part of a digital map tile, in a geographic database, and/or the like. In an example embodiment, the set of vertices and/or surface mesh are associated with a zoom level with which the set of vertices and/or surface mesh will be used for generating a visualization of the surface.

For example, a user apparatus 20 may receive the set of vertices and/or information/data defining the surface mesh and use the set of vertices and/or information/data defining the surface mesh in rendering a visualization comprising the surface and displaying the visualization via a user interface 28 (e.g., via a display of the user apparatus 20). In an example embodiment, the user apparatus may receive the set of vertices and/or information/data defining the surface mesh and use the set of vertices and/or information/data defining the surface mesh to perform one or more navigation functions corresponding to at least a portion of the surface. Some non-limiting examples of navigation functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. In various embodiments, user apparatus 20 may receive two or more sets of vertices and/or information/data defining two or more surface meshes corresponding to a surface. Each of the sets of vertices and/or information/data defining a surface mesh is associated with a zoom level. The user apparatus 20 may select the set of vertices and/or information/data defining a surface mesh to be used for the visualization and/or performing of the navigation function by matching a zoom level of the visualization and/or navigation function with the zoom level of the set of vertices and/or information/data defining the surface mesh.

Technical Advantages

Various embodiments of the present invention provide methods, apparatuses, systems, computer program products, and/or the like for defining a set of vertices for use in defining a surface mesh representing and/or approximating a surface based on terrain data describing the surface. The surface mesh is configured for use in rendering a visualization of the surface, performing one or more navigation functions corresponding to at least a portion of the surface, and/or the like, in various embodiments. Various embodiments provide a technical improvement over traditional methods for defining a set of vertices used to define a surface mesh representing and/or approximating a surface. For example, various embodiments require less computational power and/or computing time compared to traditional methods. Additionally, various embodiments provide for a configurable file size of the resulting data file storing the set of vertices and/or error level in approximating the surface described by the terrain data. Various embodiments provide for a configurable file size of the resulting data file storing the set of vertices and/or error level in approximating the surface described by the terrain data that is zoom level dependent. For example, the acceptable error level may be determined based on a zoom level with which the set of vertices will be used for displaying the visualization of the surface. For example, if the set of vertices and/or surface mesh is configured for use in generating a visualization of the surface that shows a 1 km by 1 km area, the acceptable error level may be smaller than if the set of vertices and/or surface mesh is configured for use in generating a visualization for the surface that shows a 5 km by 5 km area. In various embodiments, the file size and/or error level is configurable by changing the reset value.

Various embodiments provide improvements to the functioning of a user apparatus 20 that receives the set of vertices and/or surface mesh. For example, various embodiments perform one or more navigation functions corresponding to a user's current location (as determined by the location sensor 29 of the requesting user apparatus 20) or another user-specified location using the set of vertices and/or surface mesh defined by the set of vertices. For example, the user apparatus 20 may be configured to generate, render, and/or display a visualization of the surface via a user interface 28.

III. Example Apparatus

The apparatus 10 and/or user apparatus 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform communication and/or location determination functions, such as determining the location of a user apparatus 20. Additionally or alternatively, the apparatus 10 and/or user apparatus 20 may be embodied in other types of computing devices, such as a server, a personal computer, a computer workstation, a laptop computer, a plurality of networked computing devices, or the like. In an example embodiment, a user apparatus 20 is a mobile phone (e.g., cell phone, smart phone, and/or the like), a wearable device (e.g., smart watch, head up display, and/or the like), or an in-vehicle navigation system and an apparatus 10 is a server. In this regard, FIG. 2A depicts an example apparatus 10 and FIG. 2B depicts an example user apparatus 20 that may be embodied by various computing devices including those identified above.

As shown, the apparatus 10 of an example embodiment may include, may be associated with, or may otherwise be in communication with a processor 12 and a memory device 14 and optionally a communication interface 16 and/or a user interface 18. Similarly, the user apparatus 20 may comprise a processor 22, memory 24, a communications interface 26, a user interface 28, one or more location sensors 29 (e.g., a GNSS sensor; IMU sensors; RFID receiver/transceiver, and/or the like) and/or other components configured to perform various operations, procedures, functions or the like described herein.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 and/or user apparatus 20 may be embodied by a computing device and/or computing entity. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor 12, 22 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 and/or user apparatus 20 may include a user interface 18, 28 that may, in turn, be in communication with the processor 12, 22 to provide output to the user, such as one or more instances of map information/data and/or graphical presentations thereof, a visualization of a surface (e.g., an approximation of a surface defined by terrain data), information/data regarding one or more density areas and/or POIs, one or more routes through a road network (e.g., lane-level routes; e.g., from the current location of a user apparatus to the location of a density area and/or POI), and/or the output of one or more other navigation functions, and, in some embodiments, to receive an indication of a user input. As such, the user interface 18, 28 may include one or more output devices such as a display, speaker, and/or the like. In some embodiments, the user interface 18, 28 may include one or more input devices such as a keyboard, a mouse, a joystick, a touch screen, touch areas, soft keys, a microphone, and/or the like. In various embodiments, the user interface 18, 28 may comprise one or more other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The apparatus 10 and/or user apparatus 20 may further include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10 and/or user apparatus 20 of an example embodiment, a navigation system may also include or have access to a geographic database that includes a variety of data (e.g., map information/data) utilized in constructing a route or navigation path (e.g., a lane-level route), determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer, or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, travel lane data records, POI data records, and/or other data records. In an example embodiment, the apparatus 10 may be configured to modify, update, and/or the like one or more data records of the geographic database. For example, the network apparatus 10 may modify, update, generate, and/or the like map information/data corresponding to links, lanes of a road segments, nodes, intersection, POIs, and/or the like and/or the corresponding data records, a localization layer (e.g., comprising localization features) and/or the corresponding data records, and/or the like. In another example, the apparatus 10 may generate one or more data files comprising vertices of a surface mesh and/or defining a surface mesh that provides an approximation of a surface described by terrain data and update the geographic database to include the one or more data files. In an example embodiment, the one or more data files may be raster files.

In an example embodiment, the road segment data records are links or segments, e.g., maneuvers of a maneuver graph, representing roads, streets, travel lanes of roads and/or streets, or paths, as can be used in the calculated route or recorded route information for determination of one or more personalized routes (e.g., lane-level routes). The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example. In an example embodiment, a geographic database may corresponding to a particular POI such as a stadium, shopping mall, airport, hospital, courthouse, conference center, campus, and/or the like and comprise information/data corresponding to areas within the particular POI, paths and/or the like for traveling between areas within the particular POI, and/or the like.

The road/link segments, travel lanes, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include information/data about the POIs and their respective locations in the POI data records. The geographic database can also include data about places, such as cities, towns, or other communities, and other geographic features, such as bodies of water, mountain ranges, etc. Such place or feature data can be part of the POI information/data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records, or other records of the geographic database. In an example embodiment, a POI data record may comprise one or more POI types (e.g., restaurant, bar, hotel, gas station, library, park, and/or the like) corresponding to the POI. In an example embodiment, the POI types may be defined in a hierarchical manner. For example, a POI may be associated with the type restaurant and the sub-type Chinese restaurant.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by user apparatuses 20 through the use of update and/or notification messages. In various embodiments, the user apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or user apparatus 20 in accordance with an example embodiment may determine the time to traverse a route that includes one or more turns at respective intersections more accurately.

IV. Apparatus, Methods, and Computer Program Products

As described above, FIGS. 4 and 6 illustrate flowcharts of an apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of That which is claimed:

1. A method comprising:
accessing terrain data describing a surface, the terrain data comprising a plurality of positions, each position of the plurality of positions comprises a location and a height, wherein the terrain data comprises (a) a first position comprising a first location and a first height and (b) a second position comprising a second location and a second height;
determining curvatures of the surface between adjacent positions along the surface, wherein a first curvature between the first position and the second position is a second derivative of a connecting line between the first position and the second position, wherein the plurality of positions comprises multiple positions located on a surface spanning line that is collinear with the connecting line;
defining one or more vertices, wherein a vertex of the one or more vertices is defined by:
  determining an accumulated absolute curvature along a portion of the surface spanning line based on the curvature between points of one or more of the plurality of data points by adding the absolute value of the first curvature to the accumulated absolute curvature,
  determining whether the accumulated absolute curvature is equal to or greater than a reset value,
  when it is determined that the accumulated absolute curvature is equal to or greater than the reset value, defining a vertex at the second position, and
  when it is determined that the accumulated absolute curvature is not equal to or greater than the reset value, adding an absolute value of a second curvature to the accumulated absolute curvature, wherein the second curvature is a second derivative of a connecting line defined by the second position and a third position of the plurality of positions, the third position located on the surface spanning line; and
providing the one or more vertices for use in defining a surface mesh, wherein the surface mesh represents the surface and is configured for use in rendering a visualization of the surface via a user interface and/or performing a navigation function.

2. The method of claim 1, wherein the surface spanning line is a line of constant latitude or a line of constant longitude.

3. The method of claim 1, wherein the first and second positions are adjacent positions along the surface spanning line with no intermediate data points between the first and second data points.

4. The method of claim 1, further comprising, when it is determined that the accumulated absolute curvature is equal to or greater than the reset value, resetting the accumulated absolute curvature to zero.

5. The method of claim 1, wherein accessing the terrain data comprises reading a raster file.

6. The method of claim 1, further comprising defining one or more vertices based on an edge or a corner of the surface as described by the terrain data.

7. The method of claim 1, further comprising:
defining one or more data cells based on locations of the positions, each cell comprising multiple positions;
for each position, determining a curvature metric;
identifying an extremum metric position within each cell having the curvature metric indicating a largest curvature within the corresponding data cell; and
defining a vertex at the extremum metric position.

8. The method of claim 1, wherein providing one or more vertices comprises providing a data file comprising the one or more vertices.

9. The method of claim 1, wherein the reset value is determined based on one of: (a) a desired data file size, wherein the data file comprises the one or more vertices, (b) a desired estimation error level, or (c) a zoom level corresponding to the visualization.

10. The method of claim 1, wherein the surface mesh is provided such that one or more user apparatuses receive the surface mesh and the one or more user apparatuses are configured to (a) render a visualization of the surface for presentation via a user interface of the user apparatus and/or (b) use the surface mesh to perform one or more navigation functions.

11. The method of claim 1, further comprising, when it is determined that the accumulated absolute curvature is equal to or greater than the reset value, defining a second vertex at a location located on a second surface spanning line, the second surface spanning line being parallel to the surface spanning line and the second vertex located at an intersection of the second surface spanning line and a transverse line that is transverse to the surface spanning line and the second surface spanning line.

12. An apparatus comprising at least one processor, at least one non-transitory memory storing computer program code, and at least one communications interface configured to communicate via at least one network, the computer program code configured to, when executed by the at least one processor, cause the apparatus to at least:
access terrain data describing a surface, the terrain data comprising a plurality of positions, each position of the plurality of positions comprises a location and a height, wherein the terrain data comprises (a) a first position comprising a first location and a first height and (b) a second position comprising a second location and a second height;
determine curvatures of the surface between adjacent positions along the surface, wherein a first curvature between the first position and the second position is a second derivative of a connecting line between the first position and the second position, wherein the plurality of positions comprises multiple positions located on a surface spanning line that is collinear with the connecting line;
define one or more vertices, wherein a vertex of the one or more vertices is defined by:
  determine an accumulated absolute curvature along a portion of the surface spanning line based on the curvature between points of one or more of the plurality of data points by adding the absolute value of the first curvature to the accumulated absolute curvature,
  determine whether the accumulated absolute curvature is equal to or greater than a reset value, when it is determined that the accumulated absolute curvature is equal to or greater than the reset value, define a vertex at the second position, and when it is determined that the accumulated absolute curvature is not equal to or greater than the reset value, add an absolute value of a second curvature to the accumulated absolute curvature, wherein the second curvature is a second derivative of a connecting line defined by the second position and a third position of the plurality of positions, the third position located on the surface spanning line; and provide the one or more vertices for use in defining a surface mesh, wherein the surface mesh represents the surface and is configured for use in rendering a visualization of the surface via a user interface and/or performing a navigation function.

13. The apparatus of claim 12, wherein the surface spanning line is a line of constant latitude or a line of constant longitude.

14. The apparatus of claim 12, wherein the first and second positions are adjacent positions along the surface spanning line with no intermediate data points between the first and second data points.

15. The apparatus of claim 12, wherein the computer program code is further configured to, when executed by the at least one processor, cause the apparatus to at least, when it is determined that the accumulated absolute curvature is equal to or greater than the reset value, reset the accumulated absolute curvature to zero.

16. The apparatus of claim 12, wherein accessing the terrain data comprises reading a raster file.

17. The apparatus of claim 12, wherein the computer program code is further configured to, when executed by the at least one processor, cause the apparatus to at least define one or more vertices based on an edge or a corner of the surface as described by the terrain data.

18. The apparatus of claim 12, wherein the computer program code is further configured to, when executed by the at least one processor, cause the apparatus to at least:

define one or more data cells based on locations of the positions, each cell comprising multiple positions;

for each position, determine a curvature metric;

identify an extremum metric position within each cell having the curvature metric indicating a largest curvature within the corresponding data cell; and define a vertex at the extremum metric position.

19. The apparatus of claim 12, wherein the reset value is determined based on one of: (a) a desired data file size, wherein the data file comprises the one or more vertices, (b) a desired estimation error level, or (c) a zoom level corresponding to the visualization.

20. A computer program product comprising at least one non-transitory computer-readable storage medium having computer-executable program code instructions stored therein, the computer-executable program code instructions comprising program code instructions configured to, when executed by a processor of an apparatus, cause the apparatus to at least:

access terrain data describing a surface, the terrain data comprising a plurality of positions, each position of the plurality of positions comprises a location and a height, wherein the terrain data comprises (a) a first position comprising a first location and a first height and (b) a second position comprising a second location and a second height;

determine curvatures of the surface between adjacent positions along the surface, wherein a first curvature between the first position and the second position is a second derivative of a connecting line between the first position and the second position, wherein the plurality of positions comprises multiple positions located on a surface spanning line that is collinear with the connecting line;

define one or more vertices, wherein a vertex of the one or more vertices is defined by:

determine an accumulated absolute curvature along a portion of the surface spanning line based on the curvature between points of one or more of the plurality of data points by adding the absolute value of the first curvature to the accumulated absolute curvature, determine whether the accumulated absolute curvature is equal to or greater than a reset value, when it is determined that the accumulated absolute curvature is equal to or greater than the reset value, define a vertex at the second position, and when it is determined that the accumulated absolute curvature is not equal to or greater than the reset value, add an absolute value of a second curvature to the accumulated absolute curvature, wherein the second curvature is a second derivative of a connecting line defined by the second position and a third position of the plurality of positions, the third position located on the surface spanning line; and provide the one or more vertices for use in defining a surface mesh, wherein the surface mesh represents the surface and is configured for use in rendering a visualization of the surface via a user interface and/or performing a navigation function.

* * * * *